C. COMSTOCK.

WAGON BODY.

No. 10,308. Reissued Apr. 10, 1883.

Witnesses.

Louis F. Gardner

J. W. Garner

Inventor.

Chas. Comstock, per

F. A. Lehmann,

Atty

N. PETERS, Photo-Lithographer, Washington, D. C.

UNITED STATES PATENT OFFICE.

CHARLES COMSTOCK, OF RACINE, WISCONSIN.

WAGON-BODY.

SPECIFICATION forming part of Reissued Letters Patent No. 10,308, dated April 10, 1883.

Original No. 260,282, dated June 27, 1882. Application for reissue filed December 18, 1882.

*To all whom it may concern:*

Be it known that I, CHAS. COMSTOCK, a citizen of the United States, residing at Racine, in the county of Racine and State of Wisconsin, have invented certain new and useful Improvements in Wagon-Bodies, of which the following is a specification, reference being had therein to the accompanying drawings.

My invention relates to an improvement in wagon-bodies; and it consists, first, in a metallic casing for a wooden post which is to be used as a brace for the sides or ends of a wagon-body, the metallic casing being provided with suitable means for attaching it to the body; second, in a metallic casing for a wooden post which is to be applied to the sides or ends of a wagon-body, the casing being so shaped as to hold the wooden post securely in place, and provided with means at each of its ends for securing the casing to the body, as will be more fully described hereinafter.

Figure 3:
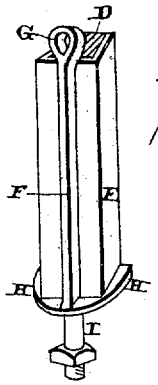
Figure 1:
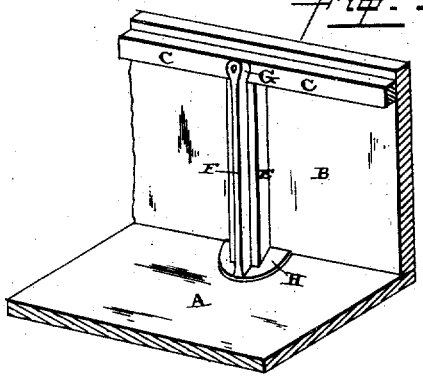
Figure 2:
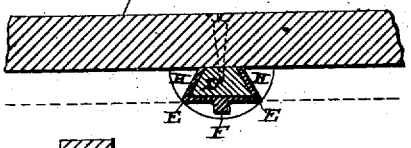
Figure 4:
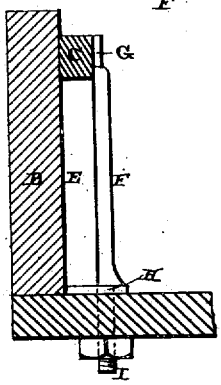
Figure 5:
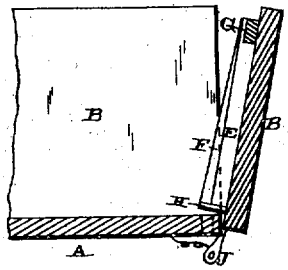

Figure 1 represents in perspective one of my improved posts in position against the side of a wagon. Fig. 2 is a horizontal longitudinal section of the same. Fig. 3 is a perspective view of the post alone. Fig. 4 is a side view of the post in position. Fig. 5 is a view of a modified form of post adapted for use in connection with the end-gate or tail-board of a wagon-body.

A represents the bottom of a wagon-body; B, the side or end, and C a cleat which extends along the inner side of the body. In order to brace and strengthen the sides and ends of the body, a suitable number of wooden posts, D, are used, each one of which is secured rigidly against the inner side of the end or side of the body by means of suitable screws or bolts, which are passed through from the outer side of the body into the posts, as shown in Fig. 2. Each one of the wooden posts D is inclosed in a metallic casing, E, so as to add to its strength and rigidity, and which casing is so shaped as to hold the two parts together without the necessity of using separate fastening devices or means for this purpose. Upon the casing is formed the rib F, which strengthens and braces it, and the upper end of the rib is made to project above the top of the casing and form an eye, G, through which a screw or bolt is passed into the cleat. Formed on the lower end of the casing is the base-plate or flange H, which rests solidly upon the bottom of the body, and serves both to brace the casing in place and to strengthen and brace the bottom of the body, so as to make it stronger and more rigid. Also formed as a part of the casing is the bolt I, which passes down through the bottom of the body, and receives a nut on its lower end for the purpose of clamping the casing rigidly thereto. When this post D and casing F are to be used in connection with the end-gate or tail-board of the body, the bolt, instead of being screw-threaded at its lower end, has its lower end formed into an eye, J, so as to form one-half of the hinge upon which the gate or board swings. The rib F adds very materially to the strength of the casing, but is not absolutely necessary for this purpose, for the side of the casing may be extended up in the form of a perforated plate, or a bolt be passed down through the cleat into the top of the wooden post.

Having thus described my invention, I claim—

1. The combination of a wagon-body with suitable wooden posts and metallic casings for the posts, substantially as shown.

2. The combination of a wagon-body with suitable wooden posts and metallic casings for the posts, the casings being provided with suitable means for securing them to the body, substantially as described.

3. The combination of a wagon-body, wooden posts inclosed in suitable metallic casings, which are provided with means for securing them to the body, and the screws or bolts, which are passed through the body into the wooden posts, substantially as set forth.

4. The combination of the end-gate of a wagon-body with the wooden posts, the metallic casings, and the bolts which project down from the casing and form part of the hinges on which the gate swings, substantially as specified.

In testimony whereof I affix my signature in presence of two witnesses.

CHARLES COMSTOCK.

Witnesses:

F. A. LEHMANN,

J. W. GARNER.